United States Patent [19]

Shoji et al.

[11] Patent Number: 4,748,228

[45] Date of Patent: May 31, 1988

[54] PROCESS FOR PRODUCING ORGANIC SILICON-TERMINATED POLYIMIDE PRECURSOR AND POLYIMIDE

[75] Inventors: Fusaji Shoji, Yokohama; Haruhiko Matsuyama, Hiratsuka; Akio Fujiwara, Fujisawa; Fumio Kataoka, Yokohama; Teruji Aizawa, Shimodate, all of Japan

[73] Assignees: Hitachi. Ltd.; Hitchi Chemical Co., both of Tokyo, Japan

[21] Appl. No.: 863,241

[22] Filed: May 14, 1986

[30] Foreign Application Priority Data

Sep. 25, 1985 [JP] Japan ................. 60-210063

[51] Int. Cl.$^4$ ............................................. C08G 77/00
[52] U.S. Cl. ..................... 528/182; 528/26; 528/28; 528/188; 528/224; 528/229; 528/351; 528/353
[58] Field of Search ............. 528/351, 182, 224

[56] References Cited

U.S. PATENT DOCUMENTS 3,948,835  4/1976  Greber ................... 528/353
4,518,735  5/1985  Goodrich et al. ......... 524/403

FOREIGN PATENT DOCUMENTS 2232556  6/1974  France ................. 528/353

*Primary Examiner*—Harold D. Anderson
*Assistant Examiner*—Frederick Krass
*Attorney, Agent, or Firm*—Antonelli, Terry & Wands

[57] ABSTRACT

An organic silicon-terminated polyimide precursor having a very stable solution viscosity is produced by polycondensing 100 parts by weight of a mixture composed of 90 to 99.5% by mole of an organic diamine represented by the following general formula (I) and 10 to 0.5% by weight by mole of an organic silyl represented by the following general formula (II):

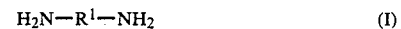

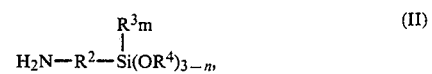

wherein $R^1$ and $R^2$ are divalent organic groups; $R^3$ and $R^4$ are monovalent organic groups; m is 0, 1, 2, or 3, with an organic tetracarboxylic acid dianhydride represented by the following general formula (III) in a molar amount corresponding to the 100 parts by weight of the mixture of the organic diamine and the organic silyl represented by the said general formulae (I) and (II), respectively, in an organic polar solvent at 0° to 40° C., thereby obtaining a solution of organic silicon-terminated polyimide precursor, and heating the solution at 50° to 80° C.:

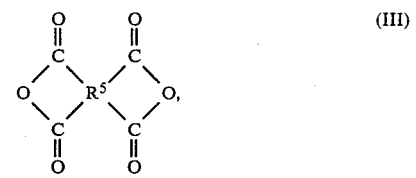

wherein $R^5$ is a tetravelent organic group. The polyimide having good adhesion and mechanical characteristics is obtained by further heating the precursor solution at 100° to 450° C.

12 Claims, No Drawings

PROCESS FOR PRODUCING ORGANIC SILICON-TERMINATED POLYIMIDE PRECURSOR AND POLYIMIDE

BACKGROUND OF THE INVENTION

This invention relates to a process for producing an organic silicon-terminated precursor and a polyimide, and more particularly to a process for producing an organic silicon-terminated polyimide having a very stable solution viscosity and a polyimide having a good adhesion.

Heretofore, silicon-containing, modified polyamide-polyimide precursors have been produced by reaction of a diamine such as an organic aliphatic diamine, or an organic aromatic diamine, or a mixture of these two diamines, with a functional silane component containing no silicon-halogen bond, as disclosed, for example, in Japanese Patent Publication No. 43-6639. However, the solutions of the precursors thus obtained have a less stable viscosity and thus the viscosity tends to decrease. That is, a film formed by coating with a solution of the precursor thus obtained has a poor precision in the film thickness and thus fails to meet the practical purpose. Furthermore, the cured film has an uneven film thickness and thus a poor reliability, and also a poor adhesion to various substrates.

SUMMARY OF THE INVENTION

An object of the present invention is to overcome the disadvantages of the prior art and to provide a process for producing an organic silicon-terminated polyimide precursor having a very stable solution viscosity and a polyimide having a good adhesion.

The object can be attained by polycondensing 100 parts by weight of a mixture composed of 90 to 99.5% by mole of an organic diamine represented by the following general formula (I) and 10 to 0.5% by mole of an organic silyl represented by the following general formula (II):

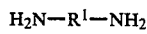

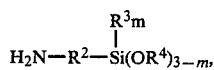

wherein $R^1$ and $R^2$ are divalent organic groups; $R^3$ and $R^4$ are monovalent organic groups; m is 0, 1, 2, or 3, with an organic tetracarboxylic acid dianhydride represented by the following general formula (III) in a molar amount corresponding to the 100 parts by weight of the mixture of the organic diamine and the organic silyl, represented by the said general formulae (I) and (II), respectively, in an organic polar solvent at 0° to 40° C., thereby obtaining a solution of organic silicon-terminated polyimide precursor, heating the solution of organic silicon-terminated polyimide precursor at 50° to 80° C., and further heating the solution heated to 50° to 80° C. at 100° to 450° C., thereby curing the solution.

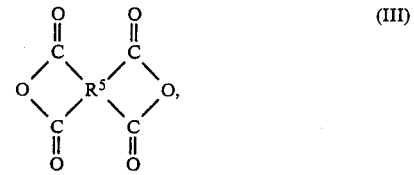

wherein $R^5$ is a tetravalent organic group.

It is preferable that the solution of organic silicon-terminated polyimide precursor is composed of 5 to 30% by weight of the organic silicon-terminated polyimide precursor and 95 to 70% by weight of the organic polar solvent.

The solution of organic silicon-terminated polyimide precursor obtained from the compounds of the said general formulae (I), (II) and (III) is homogeneous and its viscosity scarcely changes with time. The polyimide film thus obtained has a good adhesion to various substrates and also has good mechanical and electrical characteristics and a good heat resistance.

Compounds for use in the present invention will be described below.

The organic diamine represented by the general formula (I) for use in the present invention includes, for example, 4,4'-diaminodiphenylether, 3,4'-diaminodiphenylether, 3,3'-diaminodiphenylether, p-phenylenediamine, m-phenylenediamine, 2,4-diaminotoluene, 2,4-diaminoxylene, 3,5,3',5'-tetramethylbenzidine, benzidine, 3,3'-dimethylbenzidine, 1,5-naphthalenediamine, 4,4'-diaminobenzophenone, 3,3'-diaminobenzophenone, etc., and can be used alone or in a mixture of at least two thereof. Furthermore, diaminocarboxylamides such as 4,4'-diaminodiphenylether-2-carboxylamide, 3,4'-diaminodiphenylether-3-carboxylamide, 3,3'-diaminodiphenylether-3-carboxylamide, etc. can be used alone or in a mixture of at least two thereof, and diamine compounds such as 4,4'-diaminodiphenylmethane, 3-3'-diaminodiphenylmethane, 4-4'-diaminodiphenylsulfone, etc. can be used alone or in a mixture of at least two thereof. Preferably, 4,4'-diaminodiphenylether, 3,4'-diaminodiphenylether, n-phenylenediamine, p-phenylenediamine and m-phenylene, more preferably 4,4'-diaminodiphenylether and p-phenylenediamine can be used.

The organic silyl represented by the general formula (II) for use in the present invention includes, for example, 3-aminopropyltrimethoxysilane, 3-aminopropyldimethoxymethylsilane, 3-aminopropylmethoxydimethylsilane, 3-aminopropyltriethoxysilane, 3-aminopropyldiethoxymethylsilane, 3-aminopropylethoxydimethylsilane, 3-aminopropyl-tri-n-propoxysilane, 3-aminopropyl-di-n-propoxymethylsilane, 3-aminopropyl-n-propxydimethysilane, 3-aminopropyl-tri-n-butoxysilane, 3-aminopropyl-di-n-butoxymethylsilane, 3-aminopropyl-n-butoxydimethylsilane, m-aminophenyltrimethoxysilane, m-aminophenyldimethoxymethylsilane, m-aminophenylmethoxydimethylsilane, m-aminophenyltrimethylsilane, [3-(p-aminophenoxy)-propyl]-di-n-propoxymethylsilane, [3-(m-aminophenoxy)-propyl]-di-n-butoxymethylsilane, p-aminophenyl-tri-n-propoxysilane, p-aminophenyl-di-n-propoxymethyosilane, p-aminophenyl-n-propoxydimethylsilane, m-aminophenyl-tri-n-propoxysilane, m-aminophenyldinpropoxymethylsilane, m-aminophenyl-n-propoxydimethylsilane, etc., and can be used alone or in a mixture of at least two thereof. Preferably, 3-aminopropyltriethoxysilane, 3- aminopropyldiethoxymethylsilane, 3-aminopropyl-tri-n-propoxysilane, 3-aminopropyl-di-n-propoxymethylsilane, p-aminophenyl-tri-n-propoxysilane and p-aminophenyl-di-n-propoxymethylsilane can be used.

The mixing ratio of the organic diamine represented by the general formula (I) to the organic silyl represented by the general formula (II) for use in the present invention is 99.5:0.5 to 90:10% by mole, preferably 99:1 to 92:8% by mole. In case of less than 0.5% by mole of the organic silyl represented by the general formula (II), the adhesion to various substrates is lowered, whereas in case of more than 10% by mole of the organic silyl the solution of organic silicon-terminated polyimide precursor under polycondensation undergoes gellation with an actual failure of synthesis or decrease in the heat resistance and thus a failure to meet the practical purpose.

The organic tetracarboxylic acid dianhydride represented by the general formula (III) for use in the present invention includes, for example, pyromellitic acid dianhydride, 3,3',4,4'-biphenyltetracarboxylic acid dianhydride, 2,3,3',4'-biphenyltetracarboxylic acid dianhydride, 3,3',4,4'-benzophenonetetracarboxylic acid dianhydride, cyclopentanetetracarboxylic acid dianhydride, 3,3',4,4'-biphenyl ether tetracarboxylic acid dianhydride, etc. and can be used alone or in a mixture of at least two thereof. Preferably, pyromellitic acid dianhydride, 3,3',4,4'-biphenyltetracarboxylic acid dianhydride and 3,3',4,4'-benzophenonetetracarboxylic acid dianhydride can be used.

In producing the organic silicon-terminated polyimide precursor from the said compounds of general formulae (I), (II) and (III), an organic polar solvent is used. The organic polar solvent includes, for example, N-methyl-2-pyrrolidone, N,N-dimethylacetamide, N,N-dimethylformamide, N,N-diethylformamide, etc., and can be used alone or in a mixture of at least two thereof. Preferably, N-methyl-2-pyrrolidone and N,Ndimethylacetamide can be used.

It is desirable that the organic diamine represented by the general formula (I) for use in the present invention is freed from impurities such as metallic ions by recrystallization from an alcohol-based solvent, or, in case of a low melting point diamine, by distillation, and that the organic tetracarboxylic acid dianhydride for use in the present invention has a free acid content made as low as possible or freed from impurities such as metallic ions, for example, by recrystallization from acetic anhydride, etc. It is also desirable that the organic silyl and organic polar solvent for use in the present invention are freed from impurities such as metallic ions, chloride ions, water, etc. by distillation.

The process for producing the organic siliconterminated polyimide precursor according to the present invention includes a step of synthesizing it and a step of heating the thus obtained organic silicon-terminated polyimide precursor at 50° to 80° C. The synthesis step comprises dissolving an organic diamine represented by the general formula (I) and an organic silyl represented by the general formula (II) in an organic polar solvent, and adding an organic tetracarboxylic acid dianhydride represented by the general formula (III) to the solution with stirring, while keeping the solution at 0° to 40° C., preferably 10° to 30° C., thereby conducting polymerization.

The solution of the thus polymerized organic silicon-terminated polyimide precursor is further heated at 50° to 80° C. Without the heating at 50° to 80° C., the viscosity of the polyimide precursor solution increases with time, and in case of spinning coating with a photoresist spinner, the film thickness cannot be controlled without investigation of a relationship between the number of revolutions per minute and the film thickness. Such investigation complicates the operation. Without such further heating, the film thickness cannot be exactly controlled, and thus the solution fails to meet the practical purpose. In case of the heating at a temperature lower than 50° C., stirring must be carried out for a longer time until the solution viscosity is stabilized, whereas in case of the heating at a temperature higher than 80° C., the solution of organic silicon-terminated polyimide precursor undergoes gellation or further imidization, making the precursor partially insoluble in the solvent, with the result of a failure of actual synthesis or a failure to obtain a uniform film even if the synthesis can be carried out.

The thus obtained organic silicon-terminated polyimide precursor is further heated at a temperature of 100° to 450° C., preferably 150° to 450° C., preferably for 15 to 90 minutes. Below 100° C., it takes much time in imidization, or the resulting polyimide has poor heat resistance, mechanical characteristics and adhesion, and thus fails to meet the practical purpose, whereas above 450° C. the heat resistance and mechanical properties of the thus obtained polyimide are deteriorated and cannot meet the practical purpose.

The present solution of polyimide precursor has a concentration of 5 to 30% by weight, preferably 10 to 25% by weight. Below 5% by weight, the thickness of the resulting thermoset film sometimes fails to meet the desired value, whereas above 30% by weight the solution of polyimide precursor undergoes gellation with the result of a failure of actual synthesis.

Material for the substrate for use in the present invention includes, for example, metals such as Cu, Cr, Fe, etc., silicon wafer, GaAs wafer, metal oxides such as $TiO_2$, $Ta_2O_5$, $SiO_2$, $Al_2O_3$, $SiO_2$-$Al_2O_3$, etc., silicon nitride, etc.

The present invention will be described in detail below, referring to Examples.

EXAMPLE 1

9.812 g (0.041 mole) of purified 3,4'-diaminodiphenyl ether, 0.222 g (0.001 mole) of purified 3-aminopropyl-triethoxymethylsilane, and 40 g of purified N,N-dimethylacetamide were placed in a 300-ml, three-necked flask provided with a thermometer, a stirrer, and a calcium chloride tube, and stirred. The flask was cooled in an ice bath. Then, 16.106 g (0.05 moles) of purified 3,3',4,4'-benzophenonetetracarboxylic acid dianhydride was added thereto in portions over 30 to 40 minutes, while keeping the reaction solution at room temperature (about 25° C.). Then, 43.7 g of purified N,N-dimethylacetamide was added thereto while washing off the acid dianhydride deposited on the inside wall of the flask therewith. One hour after the addition of the acid dianhydride, the flask was heated in an oil bath, and after the liquid temperature reached 70° C., the mixture was further stirred for about 8 hours, whereby a varnish having a viscosity of 35 poises (measured at 25° C. by E-type viscometer) was obtained. The viscosity (25° C.) of the varnish after the preservation in a refrigerator for 3 months was 34 poises. It was found that the varnish had a good preservation stability.

A silicon wafer was coated with the varnish composed of the solution of organic silicon-terminated polyimide precursor by a spinner, heated at 200° C. for 30 minutes in a vacuum baking furnace ($10^{-3}$ Pa) and further heated at 350° C. for 30 minutes, and then the film surface was protected with Apiezon Wax (trademark of Shell Chemical Co., Ltd.). Then, the silicon wafer was removed by etching in a liquid mixture of hydrofluoric acid/nitric acid (1:2) at a liquid temperature at not higher than 10° C., and the remaining film was washed with trichlene to remove the wax therefrom, and further washed with isopropyl alcohol and then with water, and subjected to air blowing, whereby the film having the following characteristics was obtained.

Tensile strength: 14 kg/cm²
Tensile modulus of elasticity: 403 kg/cm²
Elongation: 6%
Weight reduction-starting temperature: 472° C.

The peel strength (from silicon wafer) of the film formed on a silicon wafer in the same manner was 400 g/cm or more (film breakage).

EXAMPLES 2 TO 4

Varnishes composed of solutions of organic silicon-terminated polyimide precursors prepared in the same manner as in Example 1 except that the 3,4'-diaminodiphenyl ether and the 3-aminopropyltriethoxysilane were used in amounts of 9.612 g (0.048 moles) and 0.885 g (0.004 moles); 9.411 g (0.047 moles) and 1.328 g (0.006 moles); and 9.211 g (0.046 moles) and 1.771 g (0.008 moles), respectively. Preservation stability of the varnishes and various characteristics of films obtained from the varnishes were determined in the same manner as in Example 1. As shown in Table 1, good results were obtained in Examples 2, 3 and 4.

EXAMPLE 5

A varnish composed of a solution of organic silicon-terminated polyimide precursor was prepared in the same manner as in Example 1, except that 6.1807 g (0.03086 moles) of 3,4'-diaminodiphenyl ether, 0.279 g (0.00126 moles) of 3-aminopropyltriethoxysilane and 10.147 g (0.03149 moles) of 3,3',4,4'-benzophenonetetracarboxylic acid dianhydride were used.

Preservation stability of the varnish and various characteristics of a film prepared from the varnish were determined in the same manner as in Example 1, and as shown in Table 1, good results were obtained in Example 5.

EXAMPLES 6 TO 8

Varnishes composed of solutions of organic silicon-terminated polyimide precursors were prepared in the same manner as in Example 5, except that 0.241 g of 3-aminopropyldiethoxymethylsilane, 0.203 g of 3-aminopropylethoxydimethylsilane, and 0.269 g of p-phenyltrimethoxysilane were used as the organic silyl represented by the general formula (II), respectively, in Examples 6, 7 and 8.

Preservation stability of the varnishes and various characteristics of the films prepared from the varnishes were determined in the same manner as in Example 1, and as shown in Table 1, good results were obtained in Examples 6 to 8.

TABLE 1

| | Items | | | | | | |
|---|---|---|---|---|---|---|---|
| | Varnish Viscosity (poise) | | | | Film Characteristics | | |
| | | | | | Weight reduction starting | | Tensile |
| Example No. | Initial | After 30 days | After 60 days | After 90 days | temperature (°C.) | Peel strength (g/cm) | strength (kg/cm²) |
| 2 | 12.0 | 11.9 | 11.8 | 11.8 | 465 | 500 or more (broken) | 13.2 |
| 3 | 10.8 | 10.7 | 10.7 | 10.6 | 462 | 500 or more | 12.5 |
| 4 | 10.5 | 10.6 | 10.5 | 10.4 | 458 | 500 or more | 14.1 |
| 5 | 11.7 | 11.6 | 11.7 | 11.6 | 467 | 500 or more | 13.4 |
| 6 | 11.2 | 11.1 | 11.0 | 11.0 | 463 | 500 or more | 13.0 |
| 7 | 12.3 | 12.3 | 12.2 | 12.2 | 473 | 500 or more | 13.8 |
| 8 | 11.8 | 11.8 | 11.8 | 11.7 | 481 | 500 or more | 14.8 |

EXAMPLES 9 TO 13

Varnishes composed of solutions of organic silicon-terminated polyimide precursors were prepared in the same manner as in Example 1 except that compounds represented by the general formulae (I) to (III) in amounts as shown in Table 2 were used.

Preservation stability of the varnishes and various characteristics of films prepared from the varnishes were determined in the same manner as in Example 1, and as shown in Table 2, good results were obtained in Examples 9 to 13.

COMPARATIVE EXAMPLES 1 AND 2

Purified p-phenylenediamine and 3,4'-diaminodiphenyl ether and purified N,N'-dimethylacetamide in amounts shown in Table 2 were placed in a 300-ml, 4-necked flask provided with a thermometer, a stirrer and a calcium chloride tube, and thoroughly stirred. Then, the flask was cooled in an ice bath. Then, purified 3,3',4,4'-biphenyltetracarboxylic acid dianhydride was added thereto in portions, while keeping the reaction solution at room temperature (about 25° C.). Then, 40.0 g of N,N'-dimethylacetamide was added thereto while washing off the acid dianhydride deposited on the inside wall of the flask therewith, and then the flask was heated in an oil bath. After the reaction solution temperature reached 70° C., the mixture was further stirred for about 16 hours. Then, 3-aminopropyldiethoxymethylsilane was added thereto in portions with stirring, whereby a varnish was obtained.

Preservation stability of the varnishes and various characteristics of films prepared from the varnishes were determined in the same manner as in Example 1, and as shown in Table 2, the properties of the varnishes and films were all inferior to those of the present invention in Comparative Examples 1 and 4.

TABLE 2

| Ex. No. | Mixing Amount P-PDA g (mole) | Mixing Amount 3,4'-DDE g (mole) | Mixing Amount APEMS g (mole) | Mixing Amount BPDA g (mole) | Varnish Viscosity (poise) Initial | Varnish Viscosity (poise) After 30 days | Varnish Viscosity (poise) After 60 days | Varnish Viscosity (poise) After 90 days | Film Characteristics Weight reduction starting temp. (°C.) | Film Characteristics Peel strength (g/cm) | Film Characteristics Coefficient of thermal expansion ×$10^{-5}$ °C.$^{-1}$ | Film Characteristics Tensile strength (kg/mm$^2$) |
|---|---|---|---|---|---|---|---|---|---|---|---|---|
| 9 | 4.590 (0.04244) | 1.500 (0.00749) | 0.390 (0.00204) | 15.000 (0.05098) | 57.0 | 57.0 | 57.5 | 57.5 | 510 | 510 or more (broken) | 1.6 | 16 |
| 10 | 3.240 (0.02996) | 2.000 (0.00999) | 0.312 (0.00163) | 12.000 (0.04079) | 48.0 | 48.0 | 47.6 | 47.4 | 508 | 510 or more (broken) | 2.1 | 17 |
| 11 | 2.160 (0.01997) | 4.000 (0.01998) | 0.312 (0.00163) | 12.000 (0.04079) | 41.2 | 41.0 | 41.0 | 40.8 | 505 | 510 or more (broken) | 3.2 | 16 |
| 12 | 1.080 (0.00999) | 6.000 (0.02996) | 0.312 (0.00163) | 12.000 (0.04079) | 35.1 | 35.0 | 35.0 | 34.8 | 504 | 510 or more (broken) | 3.5 | 16 |
| 13 | 0 | 9.334 (0.04661) | 0.364 (0.00190) | 14.000 (0.04758) | 22.3 | 22.3 | 22.1 | 22.1 | 502 | 510 or more (broken) | 4.2 | 12 |
| Comp. Ex. 1 | 3.308 (0.03059) | 2.042 (0.01020) | 0.312 (0.00163) | 12.000 (0.04079) | 40.5 | 22.1 | 14.0 | 8.7 | 520 | 130 | 2.0 | 18 |
| Comp. Ex. 2 | 0 | 9.528 (0.04758) | 0.036 (0.00019) | 14.000 (0.04758) | 38.6 | 18.9 | 12.4 | 7.5 | 510 | 440 | 4.1 | 13 |

Remarks:
P-PDA: p-phenylenediamine
APEMS: 3-aminopropyldiethoxymethylsilane
3,4'-DDE: 3,4'-diaminodiphenyl ether
BPDA: 3,3',4,4'-biphenyltetracarboxylic acid dianhydride
97.9 g, 80.0 g, 84.2 g, and 108.0 g of N,N—dimethylacetamide were used as a solvent in Examples 9, 10, 11, 12, and 13, respectively.

As described above, a varnish composed of a solution of organic silicon-terminated polyimide precursor having a very stable viscosity can be obtained according to the present invention, and a film prepared from the varnish by heat curing has good mechanical properties and adhesion.

What is claimed is:

1. A process for producing an organic silicon-terminated polyimide precursor, which comprises polycondensing 100 parts by weight of a mixture composed of 90 to 99.5% by mole of an organic diamine represented by the following general formula (I) and 10 to 0.5% by mole of an organic silyl represented by the following general formula (II):

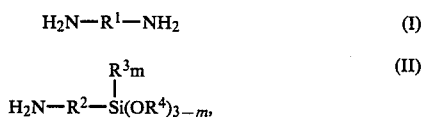

wherein $R^1$ and $R^2$ are divalent organic groups; $R^3$ and $R^4$ are monovalent organic groups; m is 0, 1, 2 or 3, with an organic tetracarboxylic acid dianhydride represented by the following general formula (III) in a molar amount corresponding to the 100 parts by weight of the mixture of the organic diamine and the organic silyl represented by the said general formulae (I) and (II), respectively, in an organic polar solvent at 0° to 40° C., thereby obtaining a solution of organic silicon-terminated polyimide precursor, and heating the solution of organic silicon-terminated polyimide precursor at 50° to 80° C.:

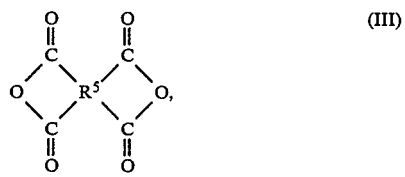

wherein $R^5$ is a tetravalent organic group.

2. A process according to claim 1, wherein the organic diamine represented by the said general formula (I) is at least one compound selected from 4,4'-diaminodiphenylether, 3,4'-diaminodiphenylether, 3,3'-diaminodiphenylether, p-phenylenediamine, m-phenylenediamine, 2,4-diaminotoluene, 2,4-diaminoxylene, 3,5,3',5'-tetramethylbenzidine, benzidine, 3,3'-dimethylbenzidine, 1,5-naphthalenediamine, 4,4'-diaminobenzophenone, 3,3'-diaminobenzophenone, or at least one compound selected from 4,4'-diaminodiphenylether-3-carboxylamide, 3,4'-diaminodiphenylether-3-carboxylamide, and 3,3'-diaminodiphenylether-3-carboxylamide, or at least one compound selected from 4,4'-diaminodiphenylmethane, 3,3'-diaminodiphenylmethane, and 4,4'-diaminodiphenylsulfone.

3. A process according to claim 1, wherein the organic silyl represented by the said general formula (II) is at least one compound selected from 3-aminopropyltrimethoxysilane, 3-aminopropyldimethoxymethylsilane, 3-aminopropylmethoxydimethylsilane, 3-aminopropyltrimethylsilane, 3-aminopropyltriethoxysilane, 3-aminopropyldiethoxysilane, 3-aminopropylethoxydimethylsilane, 3-aminopropyl-tri-n-propoxysilane, 3-aminopropyl-di-n-propoxymethylsilane, 3-aminopropyl-n-propoxymethylsilane, 3-aminopropyl-tri-n-butoxysilane, 3-aminopropyl-di-n-butoxymethylsilane, 3-aminopropyl-n-butoxydimethylsilane, m-aminophenyltrimethoxysilane, m-aminophenyldimethoxymethylsilane, m-aminophenylmethoxymethylsilane, m-aminophenyltrimethylsilane, [3-(p-aminophenoxy)-propyl]-di-n-propoxymethylsilane, [3-(m-aminophenoxy)-propyl]-di-n-butoxymethylsilane, p-aminophenyl-tri-n-propoxysilane, p-aminophenyl-di-n-propoxymethylsilane, p-aminophenyl-n-propoxydimethylsilane, m-aminophenyl-tri-n-propoxysilane, m-aminophenyldi-n-propoxymethylsilane, and m-aminophenyl-n-propoxydimethylsilane.

4. A process according to claim 1, wherein the organic tetracarboxylic acid dianhydride represented by the said general formula (III) is at least one compound selected from pyromellitic acid dianhydride, 3,3',4,4'-biphenyltetracarboxylic acid dianhydride, 3,3',4,4'-benzophenonetetracarboxylic acid dianhydride, 2,3,3',4'-biphenyltetracarboxylic acid dianhydride, cyclopentanetetracarboxylic acid dianhydride, and 3,3',4,4'-biphenylethertetracarboxylic acid dianhydride.

5. A process according to claim 1, wherein the organic polar solvent is at least one compound selected from N-methyl-2-pyrrolidone, N,N-dimethylacetamide, N,N-dimethylformamide, and N,N-diethylformamide.

6. A process according to claim 1, wherein the solution of organic silicon-terminated polyimide precursor is composed of 5 to 30% by weight of the organic silicon-terminated polyimide precursor and 95 to 70% by weight of the organic polar solvent.

7. A process for producing a polyimide, which comprises polycondensing 100 parts by weight of a mixture composed of 90 to 99.5% by mole of an organic diamine represented by the following general formula (I) and 10 to 0.5% by mole of an organic silyl represented by the following general formula (II):

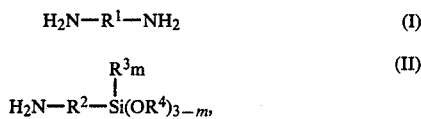

wherein R$^1$ and R$^2$ are divalent organic groups; R$^3$ and R$^4$ are monovalent organic groups; m is 0, 1, 2 or 3, with an organic tetracarboxylic acid dianhydride represented by the following general formula (III) in a molar amount corresponding to the 100 parts by weight of the mixture of the organic diamine and the organic silyl represented by the said general formulae (I) and (II), respectively, in an organic polar solvent at 0° to 40° C., thereby obtaining a solution of organic silicon-terminated polyimide precursor, heating the solution of organic silicon-terminated polyimide precursor at 50° to 80° C., and further heating the solution at 100° to 450° C., thereby curing the precursor:

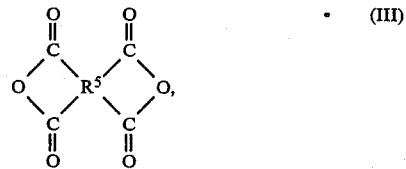

wherein R$^5$ is a tetravalent organic group.

8. A process according to claim 7, wherein the organic diamine represented by the said general formula (I) is at least one compound selected from 4,4'-diaminodiphenylether, 3,4'-diaminodiphenylether, 3,3'-diaminodiphenylether, p-phenylenediamine, m-phenylenediamine, 2,4-diaminotoluene, 2,4-diaminoxylene, 3,5,3',5'-tetramethylbenzidine, benzidine, 3,3'-dimethylbenzidine, 1,5-naphthalenediamine, 4,4'-diaminobenzophenone, 3,3'-diaminobenzophenone, or at least one compound selected from 4,4'-diaminodiphenylether-3carboxylamide, 3,4'-diaminodiphenylether-3-carboxylamide, and 3,3'-diaminodiphenylether-3-carboxylamide, or at least one compound selected from 4,4'-diaminodiphenylmethane, 3,3'-diaminodiphenylmethane, and 4,4'-diaminodiphenylsulfone.

9. A process according to claim 7, wherein the organic silyl represented by the said general formula (II) is at least one compound selected from 3-aminopropyltrimethoxysilane, 3-aminopropyldimethoxymethylsilane, 3-aminopropylmethoxydimethylsilane, 3-aminopropyltrimethylsilane, 3-aminopropyltriethoxysilane, 3-aminopropyldiethoxymethylsilane, 3-aminopropylethoxydimethylsilane, 3-aminopropyl-tri-n-propoxysilane, 3-aminopropyl-di-n-propoxydimethylsilane, 3-aminopropyl-n-propoxysilane, 3-aminopropyl-tri-n-butoxysilane, 3-aminopropyl-di-n-butoxymethylsilane, 3-aminopropyl-n-butoxydimethylsilane, m-aminophenyltrimethoxysilane, m-aminophenyldimethoxymethylsilane, m-aminophenylmethoxymethylsilane, m-aminophenyltrimethylsilane, [3-(p-aminophenoxy)-propyl]-di-n-propoxymethylsilane, [3-(m-aminophenoxy)-propyl]-di-n-butoxymethylsilane, p-aminophenyl-tri-n-propoxysilane, p-aminophenyl-di-n-propoxymethylsilane, p-aminophenyl-n-propoxydimethylsilane, m-aminophenyl-tri-n-propoxysilane, m-aminophenyl-di-n-propoxymethylsilane, and m-aminophenyl-n-propoxydimethylsilane.

10. A process according to claim 7, wherein the organic tetracarboxylic acid dianhydride represented by the said general formula (III) is at least one compound selected from pyromellitic acid dianhydride, 3,3',4,4'-biphenyltetracarboxylic acid dianhydride, 2,3,3',4'-biphenyltetracarboxylic acid dianhydride, 3,3',4,4'-benzophenonetetracarboxylic acid dianhydride, cyclopentanetetracarboxylic acid dianhydride, and 3,3',4,4'-biphenylethertetracarboxylic acid dianhydride.

11. A process according to claim 7, wherein the organic polar solvent is at least one compound selected from N-methyl-2-pyrrolidone, N,N-dimethylacetamide, N,N-dimethylformamide, and N,N-diethylformamide.

12. A process according to claim 7, wherein the solution of organic silicon-terminated polyamide precursor is composed of 5 to 30% by weight of the organic silicon-terminated polyimide precursor and 95 to 70% by weight of the organic polar solvent.

* * * * *